US005976210A

United States Patent [19]
Sensibaugh

[11] Patent Number: 5,976,210
[45] Date of Patent: Nov. 2, 1999

[54] METHOD OF MANUFACTURE FOR BIOLOGICAL CARRIER WITH WICKING ACTION AND CONTROLLED RELEASE PLANT FOOD AND MICROBE FOOD SOURCE

[76] Inventor: Phillip E. Sensibaugh, 3430 S. 400 East, Albion, Ind. 46701

[21] Appl. No.: 08/778,967

[22] Filed: Jan. 6, 1997

Related U.S. Application Data

[63] Continuation-in-part of application No. 08/391,548, Feb. 21, 1995, abandoned.

[51] Int. Cl.[6] .................................................. C05F 11/08

[52] U.S. Cl. .................................. 71/6; 71/28; 71/64.02; 71/64.07; 71/64.11; 71/904; 435/252.1; 435/262; 435/287

[58] Field of Search .................................. 71/1, 6, 7, 11, 71/27, 28, 64.11, 64.13, 904, 64.02, 64.07; 435/252.1, 262, 262.5, 287

[56] References Cited

U.S. PATENT DOCUMENTS 5,021,350 6/1991 Jung et al. .............................. 435/243

FOREIGN PATENT DOCUMENTS 2611698 9/1988 France ................................. 71/64.13

*Primary Examiner*—Ferris Lander
*Attorney, Agent, or Firm*—Roger M. Rickert

[57] ABSTRACT

A granular fertilizer which provides plant assimilatable nutrients by both hydrolysis and bacterial activity, and which includes biological growth promoting nutrients. The fertilizer is made by blending and pelletizing an aggregate of conventional fertilizing materials, biological food source materials and at least one hydrophilic material which expands upon wetting and becomes porous and wick-like upon heating to drive off absorbed water. In its dry state, the hydrophilic material wicks up applied liquid biological inoculum which remains dormant until dispensed and exposed to adequate heat and moisture.

6 Claims, 1 Drawing Sheet

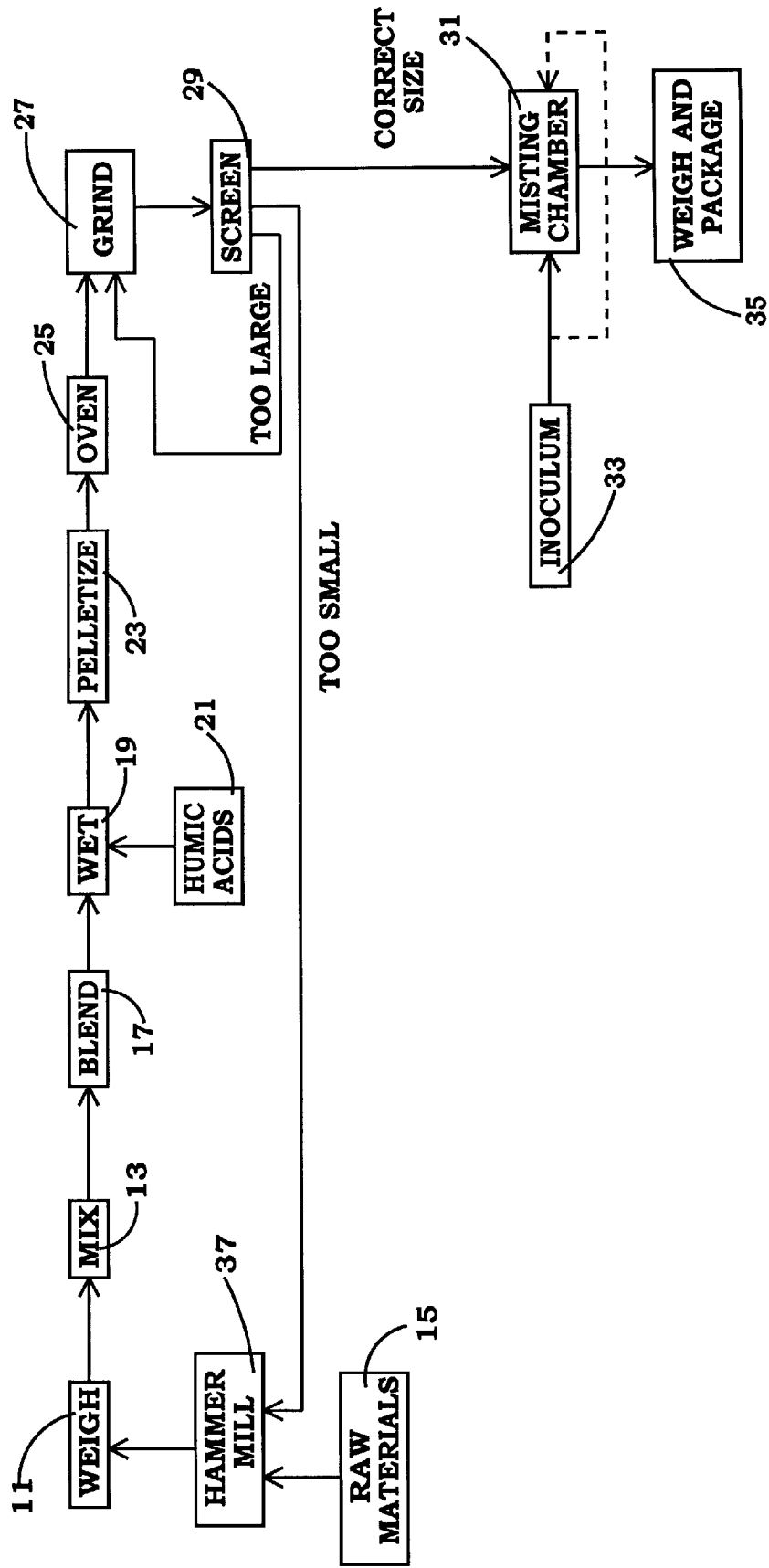

METHOD OF MANUFACTURE FOR BIOLOGICAL CARRIER WITH WICKING ACTION AND CONTROLLED RELEASE PLANT FOOD AND MICROBE FOOD SOURCE

This application is a divisional continuation-in-part of my copending application Ser. No. 08/391,548 filed Feb. 21, 1995 and now abandoned.

SUMMARY OF THE INVENTION

The present invention relates generally to fertilizers, and more particularly to a process of making a fertilizer which functions as a carrier of biological inoculum and the resulting product which serves both as a plant food source and a biological food source.

Conventional fertilizers release the plant assimilatable materials (frequently primarily nitrogen, phosphorous and potassium compounds) by hydrolysis. When such conventional fertilizers are designed to release these materials over a relatively long time span, it is by treating the surface of individual fertilizer particles with coatings of varying thicknesses or different solubilities which dissolve and release the materials at various times. Timed release is solely by hydrolysis.

The importance of soil microbes to plant growth is well known and their presence in soils in, for example, nitrogen-fixing, nitrifying and denitrifying forms is well documented. The roll of microbes and in particular, certain bacteria in suppression of soil pathogens is also well documented. When attempting to introduce beneficial microbes into the soil, they are directly dispensed in liquids as a spray, or surface coated, for example, on alfalfa seeds. There remains a need for an effective granular biological carrier allowing application of biological inoculum in conjunction with plant food and a food source for the inoculum with a single dry application.

Among the several objects of the present invention may be noted the provision of a controlled release fertilizer having no time release coating on the fertilizer particles; the provision of a fertilizer in which the plant assimilatable materials are released by hydrolysis as well as by biological activity; the provision of a fertilizer according to the previous object in which 70% or more of the plant assimilatable materials are released by biological activity; the provision of a fertilizer material which addresses the complete needs of both soil and plants; and the provision of a technique for producing a fertilizer which functions as a biological carrier and biological food source. These as well as other objects and advantageous features of the present invention will be in part apparent and in part pointed out hereinafter.

Synthetic liquid absorbent particles, for example, of clay or gypsum have been suggested in the past. Such particles typically absorb liquid primarily near the outside surface of the particle with little or no liquid reaching the center of the particle. Moreover, such particles perform no function other than that of a carrier. For example, U.S. Pat. No. 4,163,674 to Been teaches a liquid absorbent product made from plaster of Paris. Liquid applied to such particles can coat only the outside of the particle before degradation of the particle begins due to softening as liquid penetrates from the outer surface. This imposes a practical and comparatively low limit to the amount of moisture that can be added to the particle after which the particle becomes soft and crumbles very easily or sticks together with other particles causing caking up of the particles. If such granules are used as a carrier for fertilizer, when applied and exposed to water, they begin to dissolve and form a soft mass rather than breaking up and distributing their fertilizer.

Accordingly, it is another object of the present invention to provide fertilizer particles formed by creating porus wicks which expand during water absorption, then contract upon drying leaving holes to be subsequently filled by soil and/or plant nutrients which nutrients permeate the entire particle rather than simply coating the particle surface. When applied and exposed to water, such particles re-absorb the water and fracture at the wick seams rather than forming a soft mass.

In general, a fertilizer which contains plant nutrients, biological inoculum, and nutrients providing a biological food source is formed as uniformly sized granules having at least one hydrophilic component which functions as a repository for the spores of the inoculum. The spores remain dormant housed and protected within the hydrophilic component until the fertilizer is dispensed and exposed to adequate heat and moisture to facilitate their growth.

Also in general, and in one form of the invention, a process and apparatus for producing fertilizer particles containing a biologically active component, plant food nutrients, a hydrophilic material which expands upon absorbing water, and at least one biological food source material begins with measuring and mixing selected materials. Moisture is then introduced into the hydrophilic material. That moisture is subsequently removed and replaced with a liquid inoculum containing bacterial spores. Moisture removal is by an oven which heats and pasteurizes the mixed materials to destroy undesired bacteria while removing the moisture. Prior to removing the introduced moisture, the materials are formed into pellets of a selected size by an extruder which also functions to gelatinize the pellets fixing their size and increasing their density. After heating, the pellets are broken up into granules of a preferred size and granules outside a predetermined size range are rejected and recycled. The biological inoculum is introduced into the hydrophilic material in a misting chamber through which non-rejected granules fall, and into which atomized liquid containing beneficial microbial spores at an elevated pressure is introduced.

BRIEF DESCRIPTION OF THE DRAWING

FIG. 1 is a schematic diagram of one process for producing fertilizing material according to the present invention.

Corresponding reference characters indicate corresponding parts throughout the several views of the drawing. The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

In FIG. 1, the fertilizer commences by grinding then weighing and mixing, at 37, 11 and 13 respectively, appropriate quantities of conventional fertilizing materials, bacterial food source materials, a binder and at least one hydrophilic material, all at 15. This hydrophilic material not only has a high affinity for water, it does not dissolve in water such as sodium hydroxide might do. The material should expand upon wetting and become porous and wick-like upon heating to drive off absorbed water. Finally, the hydrophilic material should expand upon absorbing water. Such hydrophilic materials are referred to herein as "hydrospansive." Wheat middlings are used in a preferred embodiment, but other cellulose fibers or similar materials may be used. The mixture is then blended to a homogeneous state in blender 17 the output of which is wet at 19 with a humic acid and water solution 21. The water causes the wheat middlings to swell by a wicking action absorbing the moisture and the humic acid is present to provide yet another biological food source for the inoculum which will be introduced later. An extruder or similar machine then forms the damp materials into pellets at 23. This extrusion operation gelatinizes and densities the materials causing the mixture to solidify somewhat, fixing the size of the materials so that upon subsequent heating to drive off the moisture, capillary pores are formed for later reabsorbing the liquid inoculum. The pellets are heated in the oven 25 to both dry the hydrospansive material making it ready to accept liquid inoculum, and to kill off any undesirable bacteria present in the mixture. 2% moisture content in the pellets exiting the oven 19 is adequate, while less than 1% is more desirable. The pellets are reground at 27 and screened at 29 so that the granules entering the vessel 31 are of a uniform size of +12 to −24 or +8 to −16 U.S. Standard Sieve. The proper sized granules free-fall through the vessel 31 and are sprayed with atomized mist of liquid inoculum 33 from two or three sides. The finished fertilizer is then weighed and packaged for shipment at 35. Rejected granules too large in size are recycled back into the grinder 27 while rejected granules too small in size are further pulverized in hammer mill 37 and reintroduced with the weighed raw materials.

EXAMPLE

At the weighing 11 and mixing 13 input steps of FIG. 1, the following weights of the following materials were mixed.

| Material | Pounds/ batch | Comment |
|---|---|---|
| Wheat Middlings (1.8%) | 18 | wicking material |
| Urea (6%) | 60 | soluble nitrogen source |
| Feather meal (37%) | 370 | water insoluble nitrogen source and source of amino acids |
| Kelp meal (2.5%) | 25 | auxin, gibberellin, cytokinin source for biological food |
| Meat & bone meal (4%) | 40 | controlled release source of nitrogen, phosphorus, calcium and amino acids |
| Monammonium phosphate (6%) | 60 | readily available source of nitrogen and phosphorous |
| Misc. minor nutrients (4%) | 40 | iron, magnesium & manganese sulfates and zinc oxide |
| Sugar mixture (1.6%) | 16 | food source for the bacteria dextrose & corn syrup solids (available from A.E. Staley Manufacturing of Decatur IL) |
| Wheat Bran (0.5%) | 5 | food source for the bacteria |
| Calcium lignin sulfate (1.6%) | 16 | binding agent |
| Methylene urea (17.5%) | 175 | NUTRALENE, a controlled release nitrogen source available from Agrevo Company |
| Potassium sulfate (15%) | 150 | soluble potassium and sulfur |
| Di-calcium phosphate (2.5%) | 25 | calcium and controlled release phosphate source |

This provided an approximately 1000 pound batch as input to the blender 17. This batch was treated with about 25 pounds of a 15% humic acid solution at 19. The extruded pellets were dried at 200 degrees F. for 30 minutes to accomplish pasteurization and moisture reduction to preferably less than 1% at 25. Subsequent to drying and grinding, about 150 pounds of material was rejected and recycled through the hammer mill 37. The remaining right-sized granules were treated with atomized liquid microbial inoculum in the misting chamber 31. Here, the free-falling granules are subjected to an atomized mist at 150 PSIG, and about 10 pounds of liquid inoculum is absorbed into the 1000 pound batch. Thus, the moisture content of the finished particles is about 2% to 4% depending on the dryness of the granules prior to applying the liquid inoculum. The biological spores will generally remain inactive at moisture content below 6%.

Since the early 1900's numerous text books have been written detailing the concept of biological organisms and their roll in combating soil borne diseases and *Ecology of Soil-borne Plant Pathogens—Prelude to Biological Control* (Baker & Snyder, 1965) is one such book. As pointed out in this text, such beneficial organisms include both nitrogen-fixing strains and antifungal strains. The latter may be the antibiotic variety which directly attack the fungi, or the antagonistic variety which deprive the fungi of its nutrients. It is also acknowledged that multiple biological antagonists can work jointly to produce disease suppression in soils better than single strains of beneficial organisms and most biological inoculum incorporate multiple beneficial organisms. For example, Pseudomonas, *Trichoderma viride, Bacillus subtilis* A13 and other bacteria strains introduced as antagonist or antibiotic organisms provide vitro antibiosis to pathogenic organisms such as Rhizoctonia solani, Verticillium albo-atrum, Pithium and Fusarium. Such biological disease control inoculum are available in liquid and dry form from several sources.

The food source for the biological component of the product may be derived from several sources including feather meal, meat and bone meal, dextrose, maltodextrin, corn syrup, wheat bran, kelp meal and humic acid. Amino acids, proteins, carbohydrates, fats, auxins, gibberellis, cytokins, and the vitamins B1, E, K, riboflavine, niacin, choline and beta carotene are derived from these ingredients which become part of the formulation at 11 prior to mixing 13 and blending 17.

Feather meal, and meat and bone meal comprise about 39% of the formulation by weight and provide organic protein which is the primary source of amino acids and water insoluble nitrogen. About 92% of the feather meal is protein and 50% of the meat and bone meal is protein of which the amino acids and nitrogen are a component. A listing of the amino acids and the percentage they contribute to the total amount of protein is presented in table 1.

TABLE 1

| | | |
|---|---|---|
| Alanine 4.59% | Arginine 6.12% | Aspartic 6.96% |
| Cysteine 3.63% | Glutamic 10.14% | Glycine 7.56% |
| Histidine 0.96% | Isoleucine 4.12% | Lysine 1.63% |
| Methionine 0.61% | Phenylalanine 4.59% | Proline 9.63% |
| Serine 11.0% | Threonine 4.39% | Tryptophan 0.38% |
| Tyrosine 2.41% | Valine 7.02% | Leucine 7.03% |

The carbohydrate sources are derived from dextrose, corn syrup solids and wheat bran which comprise polysaccharide and monosaccharide carbohydrates. Monosaccharide carbohydrates react with amino acids to form an easily digestible metabolic energy source for microorganisms. Saccharide carbohydrates comprise about 2% of the formulation by weight and a list of the saccharide distribution is presented in Table 2 along with the percentage they contribute to the total carbohydrate source.

TABLE 2

| | | |
|---|---|---|
| Monosaccharide 19.6% | Disaccharide 15.1% | Trisaccharide 11.8% |
| Tetrasaccharide 9.2% | Pentasaccharide 7.4% | Hexasaccharide 5.9% |
| Heptasaccharide 4.8% | Octasaccharide 3.9% | Nonasaccharide 3.2% |
| Decasaccharide 2.6% | Higher saccharides 16.5% | |

Kelp meal comprises 2½% of the formula and humic acid about ½% of the formula by weight from which the components auxin, gibberellin cytokin and the vitamins B1, E, K, riboflavine, niacin, choline and beta carotene are derived. The kelp meal is derived from dried and ground kelp and the humic acids are derived from leonardite or peat. The total contribution of these components to the total formula is less than ¼ of the formula by weight.

The method of producing the fertilizer of the present invention should now be clear. The dry raw materials are weighed, mixed and blended. A humic acid solution is added along with water to achieve the preferred initial moisture and the aggregate formed into pellets of a preferred size. The pellets are then dried and ground into the ultimate size particles or granules. A screening then separates over-size and under-size particles which are reintroduced upstream in the process. The remaining properly sized particles are subjected to a free-fall during which fall, the granules are exposed to an atomized mist containing the liquid inoculum. The wicks within the dry granules absorb the liquid inoculum where it remains dormant or in a spore state until spread and subjected to sufficient heat and moisture to become active.

A very successful fertilizer product has been thus far described, however, in some undesirable storage or shipping situations, the particles have been know to stick to one another. One such undesirable situation is where the particles are packaged in bags, the bags stacked on pallets and several pallets stacked upon one another creating great pressure on the bags near the bottom forcing pellets together. After the liquid additive has been applied to the granule at 31, the outer surface can be coated to seal off the wicks. A concentrated urea solution in heated water is applied to the particle surface. The viscosity of the liquid urea along with the fact that the granules are cool prevents the urea from penetrating significantly into the granules. The urea coating quickly solidifies. The partially solidified urea coated particles are dusted with a talc which is hydrophobic in nature. This coating solves the problem of the particles sticking to one another.

In summary, the invention detailed herein includes a general purpose biological carrier with wicking action and a controlled release plant food and biological food source. The invention has a number of advantages over known prior fertilizers. The conventional chemical phosphorous, potash and nitrogen sources are present in about 30% of the formula and released after application by hydrolysis. The remaining 70% of the nutrients, however, are released by activity of the microbes and only under favorable moisture and temperature conditions. Finally, the microbes themselves prosper due to the presence of the polysaccharide carbohydrates and other food sources within the formulation. The biological inoculum per se functions to accelerate the decomposition of thatch and organic matter, serves as a root growth stimulant, reduces the symptoms caused by fungal disease pathogens, and improves the survival of newly germinated seedlings and transplants.

From the foregoing, it is now apparent that a novel fertilizer production technique as well as a novel biological carrying fertilizer product have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A method of making fertilizer comprising the steps of:

blending a homogenous mixture of plant food nutrients, a hydrospansive material, and at least one biological food source material;

absorbing water into the hydrospansive material;

gelatinizing the blend;

removing the water from the hydrospansive material; and absorbing liquid inoculum into the hydrospansive material.

2. The fertilizer made according to the method of claim 1.

3. The method of making a fertilizer as set forth in claim 1 including the additional steps of forming the hydrospansive material into granules after removing the water and prior to absorbing liquid inoculum, coating the granules with a concentrated urea solution, allowing the urea solution to at least partially solidify, and applying a talc coating to the at least partially solidified urea coating.

4. A method of introducing desirable biological components into granular fertilizer comprising the steps of:

introducing water into a material to cause the material to expand;

removing the introduced water from the material;

pasteurizing the material, the steps of removing and pasteurizing being performed contemporaneously by heating the material, the step of heating being preceded by extruding the material to both gelatinize the material and to form it into pellets thereby fixing the size of the material so that the material does not resume its former size upon the removal of the introduced water;

absorbing liquid inoculum with desirable biological components into the material;

grinding the pellets into granules of a preferred size;

applying a concentrated urea solution to the preferred size granules:

allowing the urea solution to at least partially solidify; and applying a talc coating to the at least partially solidified urea.

5. The method of claim 4 including the further step of rejecting and recycling granules outside a predetermined size range.

6. The method of claim 4 wherein the step of absorbing comprises dropping the non-rejected granules through an atomized mist of a liquid inoculum containing biological spores at an elevated pressure.

* * * * *